W. E. EVERETT.
TIRE PROTECTOR.
APPLICATION FILED NOV. 29, 1919.

1,357,157.

Patented Oct. 26, 1920.
2 SHEETS—SHEET 1.

Witnesses
H. B. Kirkman

Inventor
W. E. Everett
By Victor J. Evans
Attorney

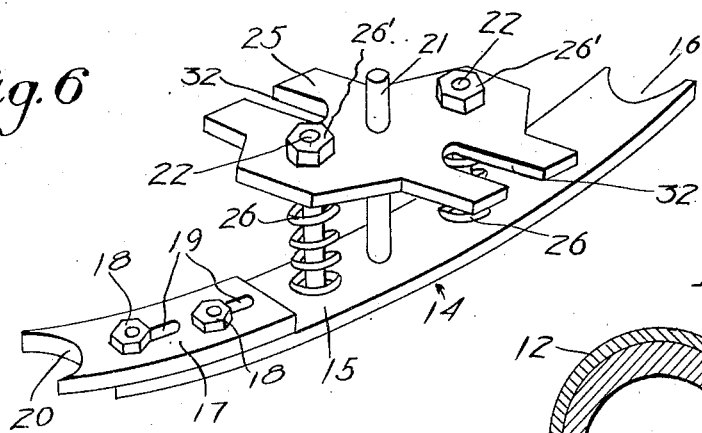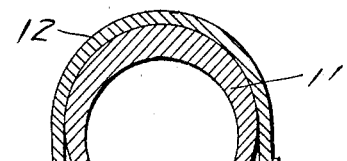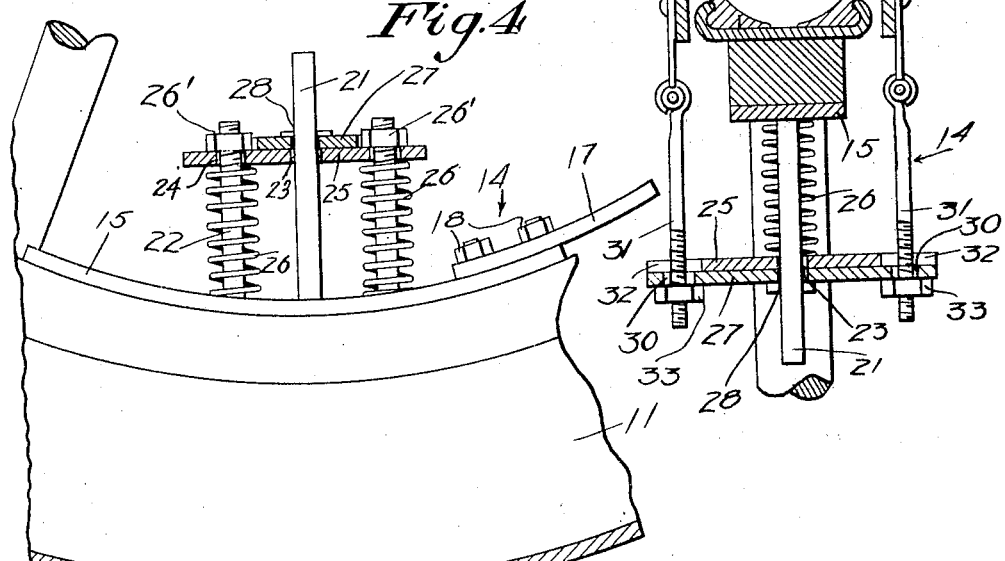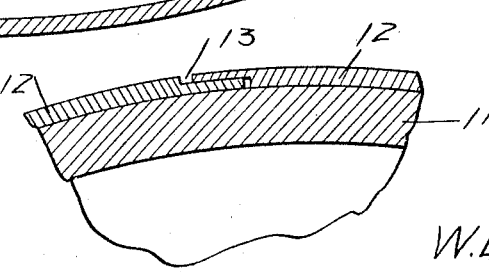

UNITED STATES PATENT OFFICE.

WILLARD E. EVERETT, OF BERKELEY SPRINGS, WEST VIRGINIA.

TIRE-PROTECTOR.

1,357,157.

Specification of Letters Patent.　　Patented Oct. 26, 1920.

Application filed November 29, 1919. Serial No. 341,412.

*To all whom it may concern:*

Be it known that I, WILLARD E. EVERETT, a citizen of the United States, residing at Berkeley Springs, in the county of Morgan and State of West Virginia, have invented new and useful Improvements in Tire-Protectors, of which the following is a specification.

This invention relates to improvements in tire armors or protectors and has for an object the provision of means which may be removably secured over the tire in a manner to permit of the resilient action of the tire.

Another object is the provision of a tire protector, which is formed of overlapping sections, each of which is removably secured over the tire in a manner to permit of independent spring action, so as to conform to the action of the tire and at the same time protect the latter from damage.

Another object is the provision of a novel form of clamp for securing the protector casing in position, the latter being removably engageable with the spokes and felly of the wheel and yieldably connected to the protector, so as to permit of relative movement.

A further object is the provision of a protector having its tread surface provided with removable traction spurs, to adapt the protector for use upon roads of various kinds.

Other objects and advantages of the invention will appear as the following description is read in connection with the accompanying drawings:

In the drawings:

Fig. 3 is an enlarged detail cross sectional view.

Fig. 4 is a fragmentary elevation of a wheel with the tire protector applied thereto, the latter being shown partly in section.

Fig. 5 is a sectional view through the overlapping ends of the protector casing.

Fig. 6 is a detail perspective view of one of the spring clamps with the removable plate omitted.

Referring to the drawings in detail, like characters of reference denote corresponding parts throughout the several views.

Figure 1:
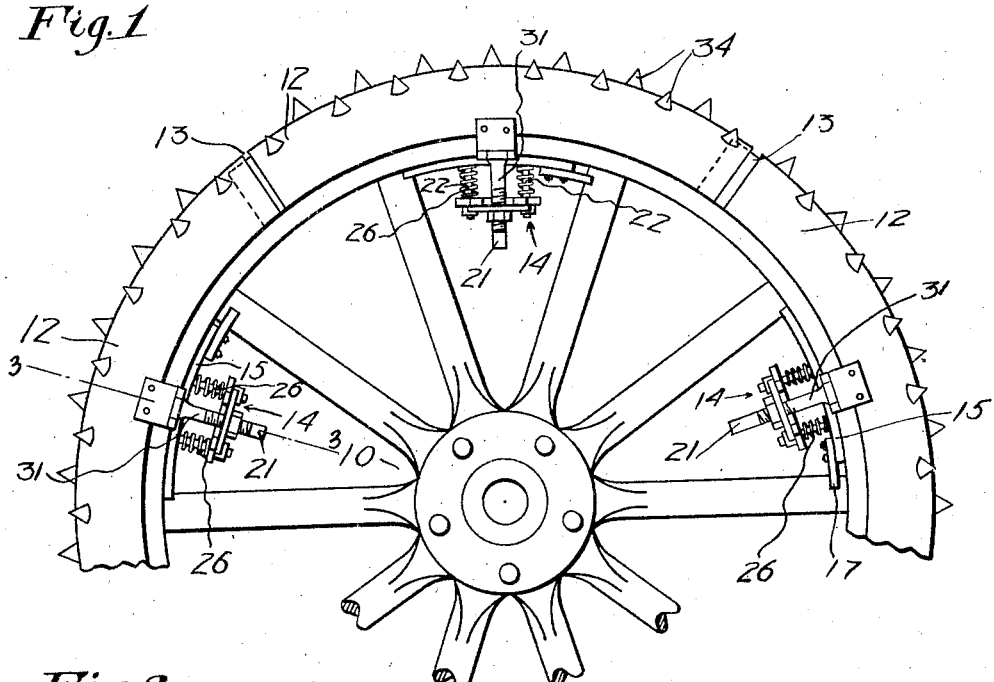
Figure 1 is a side elevation of a wheel having the improved protector applied thereto.
Figure 2:
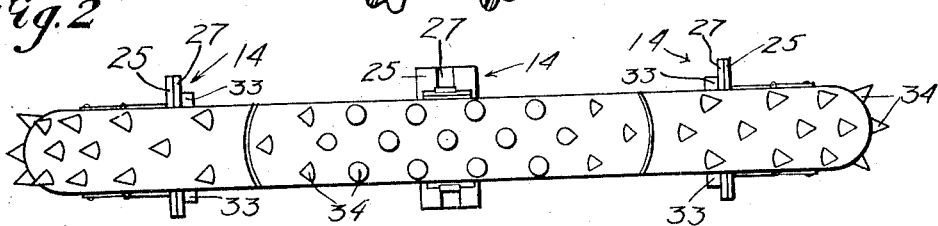
Fig. 2 is a plan view of the same.
Figure 7:
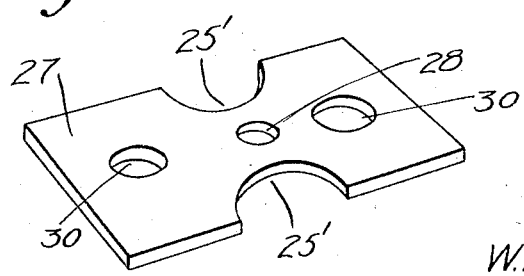
Fig. 7 is a similar view of the removable plate carried by the said clamps.

In illustrating the invention, there is shown, a wheel 10, having applied thereto in the usual or any preferred manner, a tire 11.

The invention, which is designed for the protection of the tire, comprises a plurality of sections 12, each of which have their adjacent ends overlapped as indicated at 13 in a manner to form a smooth contiguous casing, which covers and acts as a protection for the tire 11. The casing may be formed in any number of sections and each section is removably secured over the tire in a manner to permit independent relative movement. For this purpose there is provided a plurality of clamps 14, which engage the inner periphery of the felly of the wheel and the spokes of the same and are removably secured to the section 12 of the casing in a manner to be described.

Each clamp 14, comprises a felly engaging plate 15, one end of which is notched as at 16 for engagement around the adjacent spoke of the wheel. The opposite end of the plate 15 is provided with an extensible section 17, which is adjustably mounted on the ends of the said plate by means of set screw 18, which pass through elongated longitudinally disposed slots 19 formed in the adjustable section. The outer end of the said adjustable section is notched as shown at 20 for engagement around the adjacent spoke of the wheel. The plate 15 is curved to conform to the curvature of the felly of the wheel and when the notches 16 and 20 are adjusted into engagement with the spokes, the said plate will be held against accidental movement.

Extending from the plate 15 is a rod or standard 21, upon each side of which are positioned rods or standards 22. These rods or standards 21 and 22 are engageable in openings 23 and 24 respectively, formed in a slidably mounted plate 25. The plate 25 is spaced from the plate 15, through the medium of springs 26, which surround the rods or studs 22, and permit of a yielding sliding movement of the plate 25 upon the stud 21 and 22, the plate 25 is limited in its outward movement by means of nuts 26 which are mounted upon the threaded end of the rods or studs 22. The length of the center stud 21, is greater than that of the stud 22, for the purpose of receiving a plate 27, which is removably mounted upon the stud 21, an opening 23 being provided in the said plate for this purpose. The plate 27 is notched upon each side as indicated at 25', to provide for the nuts 26.

The plate 27 is provided at each end with an opening 30 for the passage of one end of a hinged bolt or rod 31, the opposite end of this bolt or rod being hingedly secured to the side of the casing sections 12. The bolt or rod 31 further passes through open ended slots 32 provided in each side of the plate 25 and after passing through the opening 30 in the plate 27, has secured upon its threaded end a nut 33.

The casing sections 12 are constructed of puncture proof material, preferably, metal, and to provide a non-skid surface for the tread of these sections, each section carries a plurality of traction spurs 34. These spurs as shown are pointed and their pyramidal formation provides three sharp edges, which extend to the shoulder of the spur and projecting from this shoulder, is a shank, which is threaded for engagement with the casing sections 12. There are preferably three rows of these spurs arranged around the tread of the protector casing and as shown are arranged in staggered formation.

The invention is susceptible of various changes in its form, proportions and minor details of construction and the right is herein reserved to make such changes as properly fall within the scope of the appended claims.

Figure 8:
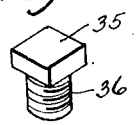
Fig. 8 is a detail view of a traction element to be substituted for the traction spur.

For example, there is illustrated in Fig. 8 a traction element to be substituted for the spur 34. This element includes a rectangular flattened head 35 and a threaded shank 36, which is adapted for use in the summer time when the sharpened spur 34 is not needed and is especially desirable for climbing hills and for protecting the threaded opening in which the spurs are secured.

Having thus described my invention what I claim as new is:—

1. A tire protector comprising a sectional casing engageable over the tire, a clamping plate positioned against the inner periphery of the wheel felly, a radially movable slide carried by said plate, laterally disposed slotted projections carried by the slide, means for yieldingly connecting the slide and plate and hinged bolts receivable in the slotted projections for removably securing the slide to the casing and holding the latter in position.

2. A tire protector comprising a sectional casing engageable over the tire, a clamping plate positioned against the inner periphery of the felly of the wheel, radially disposed guide rods carried by said plate, a slide mounted upon said guide rods, springs interposed between the clamping plate and slide, hinged bolts carried by the casing and engageable with said slide, and a removable plate positioned over the slide and engageable with the bolts for holding the casing in position.

3. A tire protector comprising a sectional casing engageable over the tire, a spring clamp engageable with the wheel felly, adjustable means connected to the clamp for engagement with the spokes of the wheel and means secured to the casing and detachably engaging the spring clamp for removably holding the casing in position.

In testimony whereof I affix my signature.

WILLARD E. EVERETT.